United States Patent [19]

Kuwabara et al.

[11] Patent Number: 4,777,000
[45] Date of Patent: Oct. 11, 1988

[54] PRODUCTION METHOD OF EXPANSION-MOLDED ARTICLE OF POLYPROPYLENE RESIN

[75] Inventors: Hideki Kuwabara, Hadano; Masato Kanbe, Hiratsuka, both of Japan

[73] Assignee: Japan Styrene Paper Corporation, Tokyo, Japan

[21] Appl. No.: 934,806

[22] Filed: Nov. 25, 1986

[30] Foreign Application Priority Data

Nov. 29, 1985 [JP] Japan ................ 60-268869

[51] Int. Cl.$^4$ ............ C08J 9/14; C08J 9/18; C08J 9/22
[52] U.S. Cl. ................ 264/51; 264/53; 264/101; 264/DIG. 9; 264/DIG. 15; 264/DIG. 16; 521/56; 521/58; 521/60
[58] Field of Search ........ 264/51, 45.4, 321, DIG. 16, 264/DIG. 9, DIG. 15, 101; 521/56, 58, 60

[56] References Cited

U.S. PATENT DOCUMENTS

| | | | |
|---|---|---|---|
| 4,206,166 | 6/1980 | Hayashi et al. | 264/321 X |
| 4,379,859 | 4/1983 | Hirosawa et al. | 521/59 |
| 4,399,087 | 8/1983 | Akiyama et al. | 264/53 |
| 4,415,680 | 11/1983 | Ushirokawa et al. | 521/56 |
| 4,436,840 | 3/1984 | Akiyama et al. | 521/58 |
| 4,440,703 | 4/1984 | Akiyama et al. | 264/50 |
| 4,567,208 | 1/1986 | Kuwabara et al. | 521/59 |
| 4,587,270 | 5/1986 | Kuwabara et al. | 521/58 |
| 4,602,082 | 7/1986 | Akiyama et al. | 528/481 |

FOREIGN PATENT DOCUMENTS 60-42433 3/1985 Japan ................ 264/45.4

OTHER PUBLICATIONS

Brydson, J. A., *Plastics Materials*, Princeton, N.J., D. Van Nostrand, ©1966, pp. 39–43.
Frank, H. P., *Polypropylene*, N.Y., Gordon and Breach Science Publishers, ©1968, pp. 36–63.
Billmeyer, Jr., Fred W., *Textbook of Polymer Science*, Second Edition, New York, Wiley-Interscience, a div. of John Wiley and Sons, Inc., ©1971, pp. 120–123, 154–174.

Primary Examiner—Philip Anderson
Attorney, Agent, or Firm—Sherman and Shalloway

[57] ABSTRACT

An expansion-molded article of a polypropylene resin is produced by filling pre-foamed particles of the polypropylene resin, which have a crystalline structure featuring an inherent peak inherent to the polypropylene resin and a high-temperature peak on the temperature side higher than the temperature corresponding to the inherent peak on a DSC curve obtained by differential scanning calorimetry of the pre-foamed particles and a bulk density of 0.04 g/cm$^3$ or higher and require melting energy of 8–12 J/g at the high-temperature peak, in a mold without applying any pretreatment to the pre-foamed particles to build up an internal pressure therein, and then heating the pre-foamed particles, whereby the pre-foamed particles are caused to expand into the expansion-molded article conforming with the mold. The pre-foamed particles may alternatively have a bulk density lower than 0.04 g/cm$^3$ and require melting energy of at least 8 J/g.

9 Claims, 2 Drawing Sheets

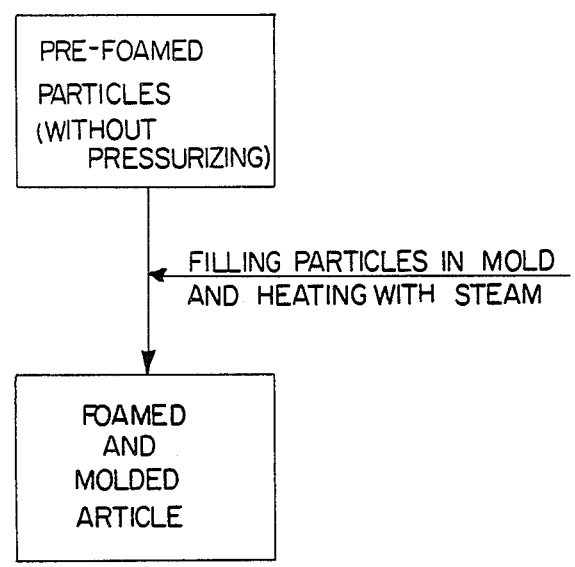

PRODUCTION METHOD OF EXPANSION-MOLDED ARTICLE OF POLYPROPYLENE RESIN

BACKGROUND OF THE INVENTION (1) Field of the Invention:

This invention relates to a method for the production of an expansion-molded article of a polypropylene resin, which method allows to obtain the expansion-molded article with good quality without need for any pretreatment to build up an internal pressure within each pre-foamed particle even when the internal pressure of the pre-foamed particles is substantially equal to the atmospheric pressure.

(2) Description of the Prior Art:

Numerous research has been conducted to obtain molded articles, which are in conformity with molds, by using pre-foamed particles of polyolefin resins. Such research has lead, for example, to techniques disclosed in Japanese Patent Laid-Open Nos. 34458/1972, 85158/1974 and 128065/1974. Each of these techniques includes as an essential requirement an additional supply of gas (organic gas, inorganic gas or the like) to pre-foamed particles of a crosslinked resin and subsequent expansion molding of the resultant pre-foamed particles upon production of an expansion-molded article from the pre-foamed particles.

Polyolefin resins are considerably different from polystyrene-base resins in gas barrier properties, viscoelastic characteristics or fluid characteristics upon melting, etc. and involve such problems that the gas in cells is immediately allowed to dissipate and loses its expanding ability, molded articles undergo shrinking, and/or the fusion-bonding among particles cannot be achieved sufficiently. As a method for overcoming such problems, it is necessary to feed an additional supply of organic gas or inorganic gas (e.g., air) to pre-foamed particles. A technical field different from that of polystyrene resins has therefore been established for polyolefin resins although they are both directed to steam chest molding of beads. It has also been known to mold ethylene resins without applying any pretreatment to build up an internal pressure therein, including the invention described in Japanese Patent Publication No. 7816/1980 for example.

The feeding of an additional supply of organic gas or inorganic gas to pre-foamed particles results in considerable loses in both equipment and cost. Its omission has hence remained as the greatest dream and at the same time the most difficult subject for those dealing with the present field of art.

For example, the invention described in Japanese Patent Laid-Open No. 34458/1972 requires a large expense for a gaseous foaming agent. On the other hand, the invention described in Japanese Patent Laid-Open No. 128065/1974 requires substantial initial cost for maintenance and safety equipment and handling system for high-temperature and high-pressure gas. The invention of Japanese Patent Laid-Open No. 85158/1974 is accompanied by such a drawback that the resulting molded articles are not stable in quality. Moreover, pre-foamed particles imparted with expanding ability by additional supply of gas as in these techniques have a common problem that their expanding ability does not last long. They are hence accompanied by a problem that excellent molded articles cannot be obtained unless a special consideration is exercised to consume pre-foamed particles within a very short period of time subsequent to the additional supply of gas, for example, by conducting the feeding step of the additional gas and the molding step continuously. They are by no means considered to have been completed to such an extent that many molding companies can produce molded articles easily from pre-foamed particles furnished by pre-foamed particles makers.

Furthermore, no promising effects were obtained from an application of the technique of the invention described in Japanese Patent Publication No. 7816/1980 to the production of expansion-molded articles of a polypropylene resin.

SUMMARY OF THE INVENTION

The present invention has been completed with these circumstances in view. An object of this invention is to provide a method for the production of an expansion-molded article of a polypropylene resin with excellent quality without need for any pretreatment to build up an internal pressure.

In one aspect of this invention, there is thus provided a method for the production of an expansion-molded article of a polypropylene resin, which comprises filling pre-foamed particles of the polypropylene resin, which have a crystalline structure featuring an inherent peak inherent to the polypropylene resin and a high-temperature peak on the temperature side higher than the temperature corresponding to the inherent peak on a DSC curve obtained by differential scanning calorimetry of the pre-foamed particles (said DSC curve having been obtained by heating 1–3 mg of the pre-foamed particles to 220° C. at a heating rate of 10° C./min by a differential scanning calorimeter) and a bulk density of 0.04 g/cm$^3$ or higher and require melting energy of 8–12 J/g at the high-temperature peak, in a mold without applying any pretreatment to the pre-foamed particles to build up an internal pressure therein, and then heating the pre-foamed particles, whereby the pre-foamed particles are caused to expand into the expansion-molded article conforming with the mold.

In another aspect of this invention, the bulk density is lower than 0.04 g/cm$^3$ and the melting energy is at least 8 J/g at the high-temperature peak.

The present invention has brought about numerous advantageous effects. For example, the method of this invention allows to conduct molding successfully even where the internal pressure of foamed particles is approximately equal to the atmospheric pressure. Since no pretreatment is required to build up an internal pressure within pre-foamed particles upon their molding, the method of this invention does not require any equipment and cost for building up such an internal pressure unlike the prior art. It is hence possible to reduce the production cost to a significant extent. Moreover, it is not necessary to conduct continuously the production step for pre-foamed particles and molding step in which the pre-foamed particles are filled in a mold and their molding is carried out therein. Molding companies can produce molded articles with extreme ease upon supply of pre-foamed particles to them.

BRIEF DESCRIPTION OF THE DRAWING

The above and other objects, features and advantages of the present invention will become apparent from the following description of the invention and the appended claims, taken in conjunction with the accompanying drawing, in which:

FIG. 2 shows a flow diagram generally depicting the process steps described above, including the steps of filling pre-foamed particles in a mold and heating to cause expansion and fusion bonding of the particles in conformity with the configuration of the mold.

DETAILED DESCRIPTION OF THE INVENTION AND PREFERRED EMBODIMENTS

Figure 1:
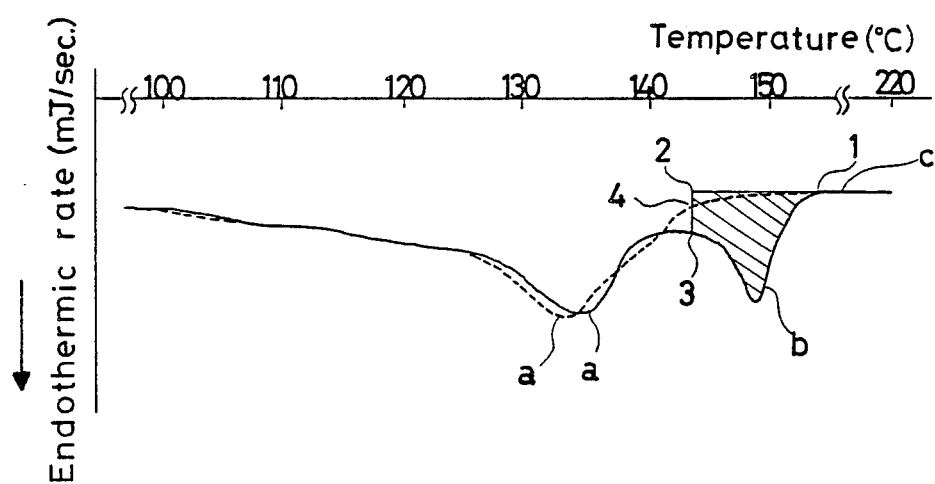
FIG. 1 shows a DSC curve obtained by differential scanning calorimetry of pre-foamed particles employed in Example 1.

As exemplary polypropylene resins useful in the practice of this invention, there may be mentioned ethylene-propylene random copolymers, ethylene-propylene block copolymers, propylene homopolymer, propylene-butene random copolymers, propylene-ethylene-butene random copolymers, etc. Of these, ethylene-propylene random copolymers, propylene-butene random copolymers and propylene-ethylene-butene random copolymers are preferable. In ethylene-propylene random copolymers, the ethylene contents may preferably be within a range of 1–10 wt. %.

The term "DSC curve obtained by differential scanning calorimetry of pre-foamed particles of a polypropylene resin" as used herein means a DSC curve obtained by heating 1–3 mg of the pre-foamed particles to 220° C. at a heating rate of 10° C./min by a differential scanning calorimeter. The inherent peak and high-temperature peak in the DSC curve can be determined, for example, from first and second DSC curves which are obtained respectively when a sample is heated from room temperature to 220° C. at a heating rate of 10° C./min and when the sample is thereafter cooled from 220° C. to about 40° C. at a cooling rate of 10° C./min and is heated again to 220° C. at a heating rate of 10° C./min.

Namely, the term "inherent peak" as used herein means an endothermic peak inherent to the polypropylene resin which constitutes the pre-foamed particles. The inherent peak appears to occur due to absorption of heat upon so-called melting of the polypropylene resin.

Such an inherent peak appears not only in the first DSC curve but also in the second DSC curve. The temperatures corresponding respectively to the tops of the peaks in the first and second DSC curves may differ a little in some instances. Their difference is however smaller than 5° C., usually, smaller than 2° C.

On the other hand, the term "high-temperature peak" as used herein means an endothermic peak which appears on the temperature side higher than the above-described inherent peak on the first DSC curve. By the term "melting energy at the high-temperature peak" as used herein is meant melting energy for the endothermic peak which appears on the temperature side higher than that corresponding to the inherent peak. The abovementioned high-temperature peak seems to be attributed to the existence of a crystalline structure different from the structure which appears as the inherent peak. The high-temperature peak appears on the first DSC curve but does not appear on the second DSC curve obtained by heating the sample under the same conditions. Accordingly, the structure which appears as the high-temperature peak is the structure that pre-foamed particles of a polypropylene resin, which were employed in the present invention, had by itself. Pre-foamed particles of a polypropylene resin, which do not show any high-temperature peak on its DSC curve, have poor in-mold moldability and are unable to provide molded articles of good quality. It is more desirable as a greater difference exists between the temperature corresponding to the inherent peak appearing on the second DSC curve and the temperature corresponding to the high-temperature peak appearing on the first DSC curve. The difference between the temperature corresponding to the top of the inherent peak on the second DSC curve and that corresponding to the top of the high-temperature peak on the second DSC curve may be at least 5° C., preferably, 10° C. or higher.

In order to permit molding without need for any pretreatment to build up a certain internal pressure, the melting energy of pre-foamed particles at the high-temperature peak is required to have a specific value in the present invention. In this case, the bulk density of the pre-foamed particles affects the value of the melting energy. When the bulk density of the pre-foamed particles is 0.04 g/cm$^3$ or greater, the melting energy corresponding to the high-temperature peak must be 8–12 J/g. When the bulk density is lower than 0.04 g/cm$^3$, the melting energy is required to be 8 J/g or more. At bulk densities lower than 0.04 g/cm$^3$, the melting energy may preferably range from 8 J/g to 34 J/g in order to assure still better secondary foamability.

If the melting energy corresponding to the high-temperature peak should be smaller than 8 J/g, the resulting molded article undergoes significant shrinkage subsequent to its removal from the mold even when molding is conducted by using such pre-foamed particles. Such small melting energy is therefore not preferred. As reasons for such significant shrinkage, the strength of cells which define pre-foamed particles appears to be weak where the pre-foamed particles require small melting energy at the high-temperature peak. Even when the melting energy is greater than 8 J/g, the secondary foamability of pre-foamed particles requiring melting energy greater than 12 J/g is too poor to provide molded articles containing fewer voids if the pre-foamed particles have a bulk density of 0.04 g/cm$^3$ or higher. As reasons for this problem, pre-foamed particles having bulk densities of 0.04 g/cm$^3$ and higher seem to have greater wall thickness and strength and hence poorer secondary foamability compared with those having bulk densities lower than 0.04 g/cm$^3$.

Pre-foamed particles of a polypropylene resin, which are useful in the practice of this invention, can be obtained, for example, by charging in a closed vessel polypropylene resin particles and based on 100 parts by weight of the resin particles, 100–400 parts by weight of water, 5–30 parts by weight of a volatile foaming agent (e.g., dichlorodifluoromethane), and 0.1–3 parts by weight of a dispersing agent (e.g., fine particulate aluminum oxide), holding the contents near a melting point Tm for a while without raising their temperature beyond a melting completion temperature $T_E$, heating the contents to a foaming temperature, and then opening the vessel at one end thereof so as to release the resin particles and water from the inside of the vessel into an atmosphere the pressure of which is lower than that in the vessel. No high-temperature peak can be obtained if the contents are heated to $T_E$ or higher even for a short period of time. By holding the contents near Tm for a while, it is possible to adjust the melting energy required at the high-temperature peak. The holding time varies depending on the type of each resin. In the case of an ethylene-propylene random copolymer, about 6–about 20 minutes are generally preferred.

In the present invention, the above-mentioned pre-foamed particles are filled in a mold and are then heated so that the pre-foamed particles are expanded and are mutually fusion-bonded. Owing to the use of pre-foamed polypropylene particles the melting energy of which has a specific value at the high-temperature peak as described above, they can be molded without need for any pretreatment to build up an internal pressure therein. Excellent expansion-molded articles can still be obtained even if pre-foamed particles having an internal pressure substantially equal to the atmospheric pressure are employed. In the method of this invention, molding is still feasible without need for any pretreatment to build up an internal pressure even when pre-foamed particles have an internal pressure ranging from a level lower than 0.18 kg/cm$^2$(G) to a level substantially equal to the atmospheric pressure. Steam is generally used to heat pre-foamed particles filled within a mold. The pressure of this heating steam may preferably be 1.5–4.5 kg./cm$^2$(G) or so.

The present invention will hereinafter be described in further detail by the following Examples and Comparative Examples.

EXAMPLES 1-6 & COMPARATIVE EXAMPLES 1-4

Charged in a closed vessel were 100 parts by weight of pellets of an ethylene-propylene random copolymer (ethylene content: 2.8 wt. %, melting point: 142° C., melting completion temperature: 152° C.), 300 parts by weight of water, dichlorodifluoromethane in an amount shown in Table 1, and 0.3 parts by weight of aluminum oxide. While stirring the contents at 142° C. (137° C. in Examples 5, 6), the contents were heated to 146° C. (140° C. in Example 5, 139° C. in Example 6), at which they were held for a predetermined period of time. While maintaining the internal pressure of the vessel at 40 kg/cm$^3$ with nitrogen gas, both water and resin particles were then released out of the vessel to obtain pre-foamed particles.

Incidentally, the bulk densities of the prefoamed particles employed respectively in Examples 5 and 6 were 0.06 g/cm$^3$ and 0.13 g/cm$^3$ immediately after their initial foaming. In Example 5, the internal pressure of the particles was adjusted to 1.5 kg/cm$^2$(G) and the particles were again heated and expanded to use same at a bulk density of 0.03 g/cm$^3$. In Example 6, the internal pressure of the particles was adjusted to 3 kg/cm$^2$(G) and the particles were heated again to a bulk density of 0.045 g/cm$^3$. Thereafter, the internal pressure of the particles was adjusted to 2 kg/cm$^2$(G) and then heated and expanded to use same at a bulk density of 0.02 g/cm$^3$.

The densities of the respective pre-foamed particles and their melting energy corresponding to the high-temperature peak, which were determined from results of their differential scanning calorimetry in accordance with the following equation, are given in Table 1.

Melting energy (J/g) =

(the area of the high-temperature peak on a chart, cm$^2$) × (the heat quantity per cm$^2$ of the chart, J/cm$^2$) ÷

(the weight of a sample measured, g)

Here, the area of a high-temperature peak b on the chart is determined from the area of a section surrounded by respective points 1,2,3 and a first DSC curve (shown by a solid line). In other words, the area of the high-temperature peak b is the area hatched in FIG. 1.

In the accompanying drawing, there are shown a melting completion temperature 1 and a crossing point 2 between a straight line extending through the melting completion temperature 1 and extrapolated directly on the lower-temperature side from a completely melted section c (about 170° C.–200° C. for example) on the DSC curve and a straight line extending at a right angle over the melting completion temperature 4 on the second DES curve (indicated by a broken line).

The above-obtained samples of pre-foamed particles were each left over at room temperature under the atmospheric pressure for 24 hours and then filled in a mold of 300 mm×300 mm×60 mm without applying any internal pressure. After reducing the internal pressure of the mold to 560 mmHg, molding was effected with 3.2 kg/cm$^2$(G) of steam. The resulting expansion-molded article was cooled and then taken out of the mold. After aging same at 60° C. for 24 hours, the molded article was left over at room temperature for 24 hours and was then evaluated. Results are also shown in Table 1.

TABLE 1

|  |  | Amount of added dichlorodifluoromethane (weight parts) | Holding time at 142° C. (min.) | Holding time at 146° C. (min.) | Bulk density of pre-foamed particles (g/cm$^3$) | Melting energy of high-temp. peak (J/g) | Overall evaluation | | |
|---|---|---|---|---|---|---|---|---|---|
|  |  |  |  |  |  |  | Expanda-[1] bility | Shrinkage[2] factor along | Shrinkage[3] factor along |
| Example | 1 | 10 | 7 | 7 | 0.1 | 8.5 |  |  |  |
|  | 2 | 13 | 7 | 15 | 0.06 | 10 |  |  |  |
|  | 3 | 15 | 7 | 15 | 0.045 | 11.5 |  |  |  |
|  | 4 | 18 | 15 | 15 | 0.03 | 13 |  |  |  |
|  | 5 | 15 | 10 min. at 137° C. | 10 min. at 140° C. | 0.03 | 23 |  |  |  |
| Comp. Ex. | 6 | 10 | 10 min. at 137° C. | 10 min. at 139° C. | 0.02 | 32 |  |  |  |
|  | 1 | 15 | 15 | 15 | 0.045 | 13 | X |  |  |
|  | 2 | 13 | 15 | 15 | 0.06 | 13 | X |  |  |
|  | 3 | 13 | 5 | 5 | 0.06 | 7 |  | X | Δ |
|  | 4 | 18 | 5 | 5 | 0.03 | 7 |  | X | Δ |

Note:
[1]The expandability of each molded article was evaluated in accordance with the following standard:
Smooth surface and TABLE 1-continued good fusion bonding
Fusion-bonded with many voids    X

[2] The shrinkage factor of each molded article along a surface thereof relative to the corresponding dimension of its corresponding mold (dimensions after aged at 60° C. for 24 hours and then left over at room temperature for 24 hours) was evaluated in accordance with the following standard:
Shrinkage factor less than 3%
Shrinkage factor greater than 5%    X

[3] The shrinkage factor of each molded article along the thickness thereof relative to the corresponding dimension of its corresponding mold (dimensions of a central part of the molded article after aged at 60° C. for 24 hours and then left over at room temperature for 24 hours) was evaluated in accordance with the following standard:
Shrinkage factor less than 3%
Shrinkage factor of 3-5%    Δ
Shrinkage factor greater than 5%    X

Having now fully described the invention, it will be apparent to one of ordinary skill in the art that many changes and modifications can be made thereto without departing from the spirit or scope of the invention as set forth herein.

We claim:

1. A method for the production of an expansion-molded article of a polypropylene resin, which comprises filling pre-foamed particles of the polypropylene resin, which have a crystalline structure featuring an inherent endothermic peak inherent to the polypropylene resin and a high-temperature endothermic peak on the temperature side higher than the temperature corresponding to the inherent peak on a DSC curve obtained by differential scanning calorimetry of the pre-foamed particles (said DSC curve having been obtained by heating 1-3 mg of the pre-foamed particles to 220° C. at a heating rate of 10° C./min by a differential scanning calorimeter) and a bulk density of 0.04 g/cm$^3$ or higher and require melting energy of 8-12 J/g at the high-temperature peak, in a mold, and then heating the pre-foamed particles, whereby the pre-foamed particles are caused to expand and fuse together into the expansion-molded article conforming with the mold.

2. The method as claimed in claim 1, wherein the base resin of the pre-foamed particles is an ethylene-propylene random copolymer.

3. The method as claimed in claim 2, wherein the ethylene-propylene random copolymer has an ethylene content of 1-10 wt. %.

4. A method for the production of an expansion-molded article of a polypropylene resin, which comprises filling pre-foamed particles of the polypropylene resin, which have a crystalline structure featuring an inherent endothermic peak inherent to the polypropylene resin and a high-temperature endothermic peak on the temperature side higher than the temperature corresponding to the inherent peak on a DSC curve obtained by differential scanning calorimetry of the pre-foamed particles (said DSC curve having been obtained by heating 1-3 mg of the pre-foamed particles to 220° C. at a heating rate of 10° C./min by a differential scanning calorimeter) and a bulk density lower than 0.04 g/cm$^3$ and require melting energy of at least 8 J/g at the high-temperature peak, in a mold, and then heating the pre-foamed particles, whereby the pre-foamed particles are caused to expand and fuse together into the expansion-molded article conforming with the mold.

5. The method as claimed in claim 4, wherein the base resin of the pre-foamed particles is an ethylene-propylene random copolymer.

6. The method as claimed in claim 5, wherein the ethylene-propylene random copolymer has an ethylene content of 1-10 wt. %.

7. The method as claimed in claim 4, wherein the pre-foamed particles have a bulk density smaller than 0.04 g/cm$^3$ and require melting energy of 8-34 J/g at the high-temperature peak.

8. The method of claim 1 wherein the internal pressure of the pre-foamed particles which are filled in the mold is at or about atmospheric pressure.

9. The method of claim 4 wherein the internal pressure of the pre-foamed particles which are filled in the mold is at or about atmospheric pressure.

* * * * *